(12) United States Patent
Farrar et al.

(10) Patent No.: US 10,540,372 B2
(45) Date of Patent: *Jan. 21, 2020

(54) SAFE SYNCHRONIZATION OF PARALLEL DATA OPERATOR TREES

(71) Applicant: SYBASE, INC., Dublin, CA (US)

(72) Inventors: Daniel James Farrar, Kitchener (CA); Evguenia Eflov, Kitchener (CA)

(73) Assignee: SYBASE, INC., Dublin, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/934,755

(22) Filed: Mar. 23, 2018

(65) Prior Publication Data

US 2018/0210938 A1   Jul. 26, 2018

Related U.S. Application Data

(63) Continuation of application No. 14/169,898, filed on Jan. 31, 2014, now Pat. No. 9,953,074.

(51) Int. Cl.
  *G06F 16/27* (2019.01)
  *G06F 16/21* (2019.01)
  *G06F 9/52* (2006.01)

(52) U.S. Cl.
  CPC .............. *G06F 16/275* (2019.01); *G06F 9/52* (2013.01); *G06F 16/21* (2019.01)

(58) Field of Classification Search
  CPC ......... G06F 17/30581; G06F 17/30289; G06F 17/30433; G06F 17/30463; G06F 16/275; G06F 16/21; G06F 9/52
  See application file for complete search history.

(56) References Cited

U.S. PATENT DOCUMENTS

| | | |
|---|---|---|
| 5,857,180 A | 1/1999 | Hallmark et al. |
| 6,009,265 A | 12/1999 | Huang et al. |
| | (Continued) | |

FOREIGN PATENT DOCUMENTS

WO   WO-9637834 A1   11/1996

OTHER PUBLICATIONS

"U.S. Appl. No. 14/169,898, Advisory Action dated Jul. 25, 2017", 3 pgs.

(Continued)

*Primary Examiner* — Jeff A Burke
*Assistant Examiner* — Huen Wong
(74) *Attorney, Agent, or Firm* — Schwegman Lundberg & Woessner, P.A.

(57) ABSTRACT

An operator tree is formed for a data processing plan, the operator tree containing a plurality of interconnected nodes and including a grouping of two or more duplicative portions, each of the two or more duplicative portions having identical nodes and structure such that when the operator tree is executed, operators executed in a first duplicative portion using a first thread perform same functions use different data than operators in a second duplicative portion using a second thread. One or more operators in the first portion and one or more operators in the second portion to be synchronized with each other are identified. A synchronization point is created for the identified operators in the first thread and one or more subsequent threads, wherein the synchronization point receives information from each of the identified operators to build an artifact to deliver to one or more operators that depend on the artifact.

20 Claims, 10 Drawing Sheets

(56) References Cited

U.S. PATENT DOCUMENTS

| | | | |
|---|---|---|---|
| 6,341,281 | B1 | 1/2002 | Macnicol et al. |
| 6,594,651 | B2 | 7/2003 | Kabra et al. |
| 6,691,101 | B2 | 2/2004 | MacNicol et al. |
| 6,799,184 | B2 | 9/2004 | Bhatt et al. |
| 6,801,905 | B2 | 10/2004 | Andrei |
| 6,816,952 | B1 | 11/2004 | Vartti et al. |
| 6,865,567 | B1* | 3/2005 | Oommen .......... G06F 17/30463 |
| 7,574,424 | B2 | 8/2009 | Chowdhuri |
| 7,849,073 | B2 | 12/2010 | Young-Lai |
| 8,219,546 | B2 | 7/2012 | Yan et al. |
| 8,326,625 | B2 | 12/2012 | Nehme et al. |
| 8,402,469 | B2 | 3/2013 | Bose et al. |
| 9,953,074 | B2 | 4/2018 | Farrar et al. |
| 2002/0032676 | A1 | 3/2002 | Reiner et al. |
| 2006/0070045 | A1* | 3/2006 | Senda ................. G06F 9/5016 717/136 |
| 2006/0206635 | A1 | 9/2006 | Alexander et al. |
| 2006/0218123 | A1* | 9/2006 | Chowdhuri ....... G06F 17/30445 |
| 2007/0067573 | A1 | 3/2007 | Bruening |
| 2009/0077082 | A1 | 3/2009 | Magruder et al. |
| 2009/0319499 | A1 | 12/2009 | Meijer et al. |
| 2012/0078939 | A1 | 3/2012 | Chen et al. |
| 2012/0079502 | A1 | 3/2012 | Kwan et al. |
| 2013/0151502 | A1 | 6/2013 | Yoon et al. |
| 2014/0089294 | A1* | 3/2014 | Shankar ............ G06F 17/30463 707/718 |
| 2014/0310259 | A1* | 10/2014 | Tian ................. G06F 17/30545 707/718 |
| 2015/0220611 | A1 | 8/2015 | Farrar et al. |

OTHER PUBLICATIONS

"U.S. Appl. No. 14/169,898, Examiner Interview Summary dated May 31, 2017", 4 pgs.
"U.S. Appl. No. 14/169,898, Examiner Interview Summary dated Jun. 13, 2016", 3 pgs.
"U.S. Appl. No. 14/169,898, Examiner Interview Summary dated Oct. 6, 2016", 4 pgs.
"U.S. Appl. No. 14/169,898, Examiner Interview Summary dated Dec. 27, 2016", 3 pgs.
"U.S. Appl. No. 14/169,898, Final Office Action dated Apr. 21, 2017", 19 pgs.
"U.S. Appl. No. 14/169,898, Final Office Action dated Jul. 1, 2016", 18 pgs.
"U.S. Appl. No. 14/169,898, Non Final Office Action dated Apr. 19, 2016", 15 pgs.
"U.S. Appl. No. 14/169,898, Non Final Office Action dated Aug. 28, 2017", 19 pgs.
"U.S. Appl. No. 14/169,898, Non Final Office Action dated Nov. 4, 2016", 21 pgs.
"U.S. Appl. No. 14/169,898, Notice of Allowance dated Jan. 11, 2018", 7 pgs.
"U.S. Appl. No. 14/169,898, Response filed Jun. 7, 2017 to Final Office Action dated Apr. 21, 2017", 16 pgs.
"U.S. Appl. No. 14/169,898, Response filed Jun. 10, 2016 Response to Non Final Office Action dated Apr. 19, 2016", 13 pgs.
"U.S. Appl. No. 14/169,898, Response filed Oct. 13, 2016 to Final Office Action dated Jul. 1, 2016", 14 pgs.
"U.S. Appl. No. 14/169,898, Response Filed Nov. 22, 2017 to Non Final Office Action dated Aug. 28, 2017", 18 pgs.
"U.S. Appl. No. 14/169,898, Response filed Dec. 28, 2016 to Non Final Office Action dated Nov. 4, 2016", 13 pgs.
"European Application Serial No. 14004183.1, Office Action dated Jun. 9, 2015", 7 pgs.
"European Application Serial No. 14004183.1, Office Action dated Jun. 14, 2018", 8 pgs.
"European Application Serial No. 14004183.1, Summons to attend oral proceedings pursuant to Rule 115(1), dated Jun. 13, 2019", 11 pgs.

* cited by examiner

SAFE SYNCHRONIZATION OF PARALLEL DATA OPERATOR TREES

CROSS-REFERENCE TO RELATED APPLICATIONS

This application is a continuation of prior application Ser. No. 14/169,898, filed on Jan. 31, 2014, which is incorporated by reference herein in its entirety.

TECHNICAL FIELD

This document generally relates to methods and systems for use with databases or data processing software. More particularly, tins document relates to the safe synchronization of parallel data operator trees

BACKGROUND

The processing of queries, such as in databases or in general data processing, can be a very time- and processor-intensive task. As such, it is often desirable to introduce at least some level of parallel processing to these tasks. Typically, in conventional solutions, a query is parsed into a tree containing data operators and then branches or entire subtrees of tins tree are duplicated and run in parallel. This allows, for example, one subtree to operate on one portion of the data and then an identical but separate instance of the subtree to operate on another portion of the data. The results of both parallel executions of the subtrees are generally combined. This is known as the Volcano query-processing model.

Such conventional types of parallelization models, however, have several drawbacks. It is common for database queries to have dependencies between the data operators. For example, when data is requested from an operator (for example, a join), the operator (e.g., parent operator) must request data from its child operators. Furthermore, additional synchronization generally may occur. For example, a parallel hash join typically must build a hash table for the portion of the input seen by each thread of execution locally, then the hash tables must be merged while all other threads wait. Inter-operator calls at different levels are not simple to execute, and require a high degree of resources to maintain synchronization. Additionally, the potential for deadlocks is high, because the structure of operators/calls is different or each query type, and dependencies between different levels of the operator tree/call stack can exist simultaneously in ways that are not easy to predict. Additionally, some variants of the Volcano query-processing model allow operators to call their child operators in any order, according to the needs of the parent operator, introducing additional dependencies.

Intra-query parallelism solutions that are currently implemented provide that the only communication occurring between operators happens when parent operators request an action (typically the supplying of rows) from their child operators. This simplifies reasoning about arbitrarily complex operator trees, and only requires system developers to think about the local behavior of each operator. However, as briefly described earlier, there is a need for coordination of the various branches of a parallel operator. This coordination is provided by the operator on a single branch (the "master") which is specially initialized for this purpose. Parallel operators each operate on their own thread, and a parallel plan is optimized and built with a maximum parallel degree chosen by an optimizer. Each parallel branch then has its own tree of operators, which mirrors the tree of its siblings. For example, a tree of operators can include one or more exchange operators. An exchange operator can exchange data cross process and processor boundaries. When the first fetch is performed on a cursor and the fetch reaches the exchange operator, the exchange operator determines how many worker threads are available to be used by the plan and initialized these worker threads, one per branch (up to the maximum degree of the plan).

In one specific example embodiment, each worker thread (e.g., ExchangeRequest) then proceeds (more or less) independently, using a model of (etching rows from its child operators, processing them, and passing them up to the Exchange. In this case, some of the parallel operators should be synchronized.

One reason for synchronization is to reflect an actual data dependency. For example, a merged hash table can only be able to be built once all the branches contributing to it have built their portion of it; no branch can probe a merged bash table until all branches have finished building and one thread has performed the merge. There can also be instances where synchronization is an artifact. For example, each thread is responsible for deleting every object it creates, and only those objects. Furthermore, it can only delete the objects once the rest of the threads are done accessing them.

In one specific example embodiment, all of this synchronization is implemented by large numbers of specialized, named semaphores (typically condition variables) within each of the parallel operators. There are a large number of bugs caused by unexpected interactions between all of these coordinating semaphores and cleanup of objects accessed by all threads. These bugs are typically deadlocks, but also include crashes. Fixes for the deadlocks can be utilized, but these often introduce new faults in to the code that later show up as new bugs. Either the fix to the deadlock is too aggressive, in which case faults are encountered where an item that needs to be synchronized is no longer synchronized, or new deadlocks are introduced but pushed up or down one level of the code.

One issue is that the synchronization patterns and the interactions between the synchronization requirements of different operators (especially if they are at different levels of a plan) are very hard to predict. The use of a master branch to control shared state between ail of the sibling branches is one of the problem areas. This design means that not all branches can be fetched from equally; the master branch depends on its parent(s) fetching from it in a certain order, relative to its siblings. However, some operators have their own ordering requirements and don't know about the ordering requirements of their children.

Another weakness is that the processing that is performed at a lower level of the branch tree can be required even if the upper level of the branch does not use it (either because its evaluation was short-circuited or because it hit a runtime error). This is because all branches typically use the results of shared processing that is performed by lower levels. This can be handled by utilizing pipeline parallelism, where each region of a tree runs in a separate thread, so processing is performed at lower levels of a parallel branch even if the upper levels of that particular branch did not request it. Regions of the tree can be imposed by the synchronization points. For example, in FIG. 4, subtree 204, 208, and 212 form one such region. Part of the work performed by a parallel join hash operator belongs to the region under the parallel join hash operator (the part that belongs to the build side). This has its own weakness, however, in that lower levels of the branch can end of performing work that is not needed.

A further characteristic of current implementations is a lack of clean separation between static and dynamic portions of a plan. This does not present a source of bugs, but it does require the stateful and stateless portions of execution objects to be more closely tied than necessary, which increases code complexity. The static information persists across multiple executions of a cursor, but the objects storing the static information is duplicated for each branch of a parallel plan thus keeping many versions of the static plan context. By contrast, dynamic objects that are created during a fetch typically only endure while foe cursor is still fetching.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details axe set forth in order to provide an understanding of various embodiments of the inventive subject matter. It will be evident, however, to those skilled m the art that embodiments of the inventive subject matter can be practiced without these specific details. In general, well-known instruction instances, protocols, structures, and techniques have not been shown in detail.

In an example embodiment, a solution is provided that safely meets synchronization dependencies needed by parallel nested operators/procedure calls more specifically, safe synchronization of parallel threads performing nested execution is facilitated, where dependencies exist between layers of execution (e.g., subroutine calls from a parent routine) and branches of execution (e.g., multiple threads performing the same call) in a query tree, and where different branches in the query tree can be called in any order.

Figure 1:
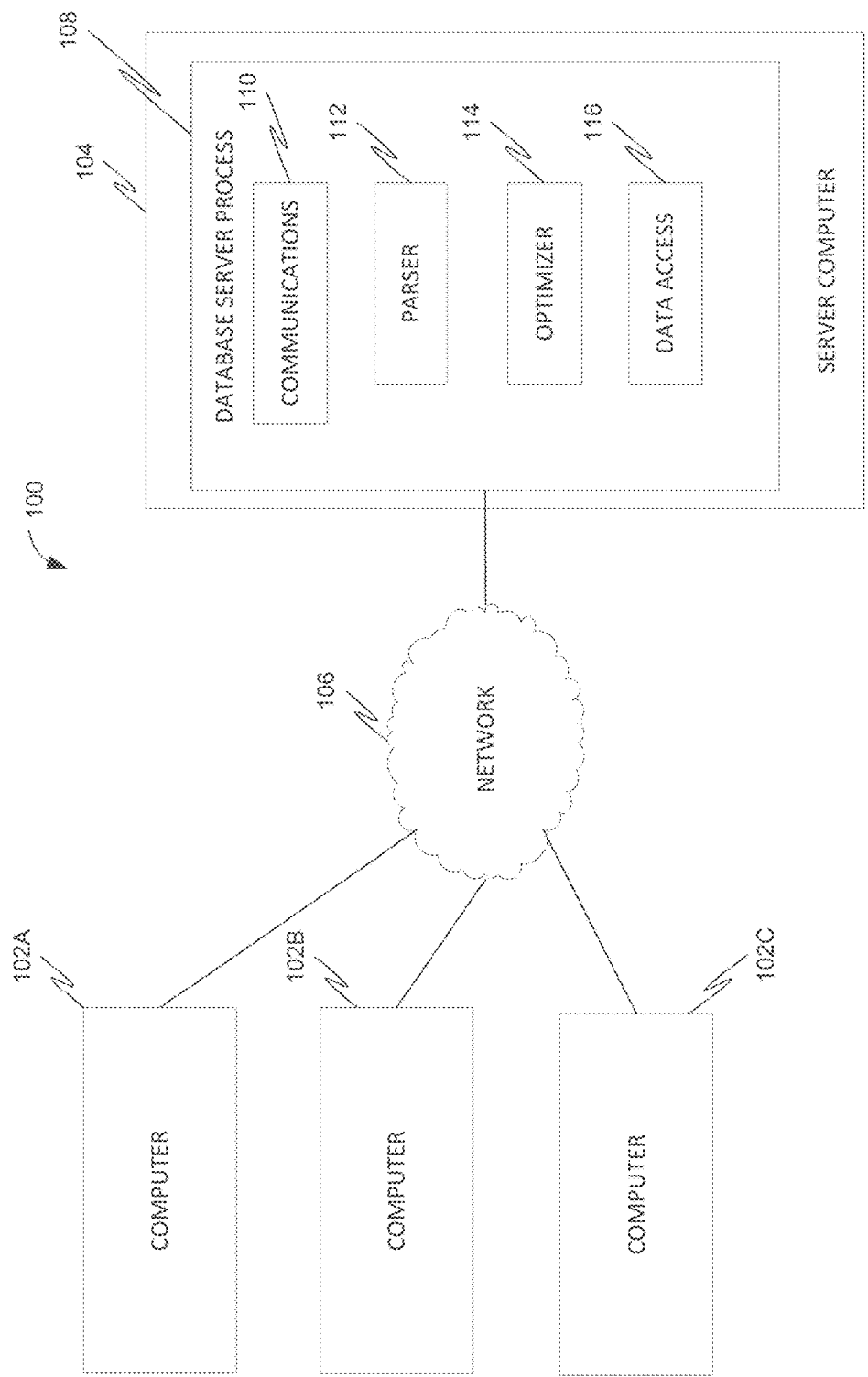
FIG. 1 is a block diagram illustrating a system, in accordance with an example embodiment, for building data processing operations in parallel.

FIG. 1 is a block diagram illustrating a system 100, in accordance with an example embodiment, for building data processing operations in parallel. The system includes one or more client computers 102A, 102B, 102C, each connected to a server computer 104 via a network 106. The server computer 104 can include a database server process 108, which can execute various database functions on the server computer 104. It should be noted that while this disclosure can describe various embodiments for use in database systems, implementations are also foreseen for use in non-database systems. Indeed, the presently described techniques can be used anytime an operator tree is built for a data processing plan, regardless of whether a database is used.

Referring back to FIG. 1, the database server process 108 can include a communications component 110, a parser 112, an optimizer 114, and a data access component 116. The various techniques described in this disclosure can be performed, for example, in the data access component 116.

A query execution module can be executed in parallel. Intra-operator parallelism is where a single logical operator is executed by different threads, which may share intermediate data structures. A query can be parsed, for example, by parser 112, into a tree containing data operators. A data operator is hereinafter also referred to as tin operator. A tree of operators cars include nodes and branches. The branches, which are hereinafter also referred to as siblings, can include various levels of operators. The data access component 116 can synchronize parallel operators. In an example embodiment, synchronization point module, hereinafter referred to as a "synchronization point" is introduced as an entity to isolate sibling operator co-ordination. A synchronization point can include a unit of work that is shared by branches, and can synchronize data such that, for example, the shared data or state data is created before a Create operation is completed on any branch, and that the shared data or state data is available until all the branches are done with the data (until all the branches have started a Destroy operation). The synchronization point allows a user (e.g., programmer) to explicitly identify shared units of work and the dependencies between the shared units of work. A synchronization point can be created for each artifact or deliverable (immediate unit of work) produced by a tree of operators/procedure calls. An artifact represents one or more units of work, for example, based on user input, that are shared between branches and any dependencies between the units of work. Each thread can then interact with the synchronization point using a synchronization point client. A synchronization point client is a communication entity between a given synchronization point and the branch of execution. It should be noted that, in one example embodiment, communication between the branch of execution and a given synchronization point is achieved by means of a synchronization point client. However, in other embodiments the work can be performed directly by the synchronization point.

The synchronization point client allows the individual threads to request the creation of the work performed, or artifact created, by the synchronization point.

"report for duty" to perform the portion of the work required of that thread report completion of access to shared data by this thread, requesting destruction of the shared artifact Once any thread has requested the instantiation of an artifact represented by a synchronization point, the artifact will be created. Each thread is then guaranteed to perform the work it has committed to do, even if its flow of control does not directly reach the code used to execute it. This can be achieved by "teleporting" threads to lower contexts of execution if they have not reached them as part of their normal execution path. Teleporting involves switching execution context to a different (child or older sibling) synchronization point. Teleports can then be reversed once the work in the new context is completed. In one example embodiment, these synchronization points can be created from a static query plan, although in some example embodiments they can be created dynamically.

In an example embodiment, the faults described above are alleviated by addressing the two main weaknesses of the current designs. Specifically, a notion of a master branch has been eliminated, allowing operators above a master operator to fetch rows from their children in whatever order makes sense for the particular operation. This relieves she maintainer of an operator from needing to worry about the implementation details of possible child operators. Instead, where there is a need for some action to take place before or after all threads perform their obligation at a given synchronization point, the first (or last) thread to arrive at that operator can perform it.

The second issue that is addressed is that it is facilitated that the units of work performed at different levels of a plan are performed for each branch, even if the flow of control for a branch does not reach that low. Since each unit of work that contributes to a shared object is logically independent, either separate threads are crated that correspond to these units of work, or it is facilitated that these units of work are performed by foe existing threads. In an example embodiment, the latter approach is used, with threads that "teleport" their execution to locations they are responsible for executing.

In an example embodiment, sibling operator coordination is isolated into a single entity called a synchronization point. A synchronization point is a unit of work that is shared by all the branches, and the synchronization guarantees attached to the synchronization point, namely that shared data is created before the create operation is completed on any branch and shared data is not destroyed until all branches are finished with it.

In an example embodiment, the logical synchronization point is implemented using two classes: a df_SyncPoint object represents a deliverable or artifact that is built by multiple threads, and that is needed by operators above it. This deliverable/artifact will usually be a structure, such as a merged hash table. However, in some cases it can represent a state that is only achieved when all threads reach a certain point.

The second class is a df_SyncPointClient class. Each branch interacts with a synchronization point by instantiating the df_SyncPointClient class. A df_SyncPointClient represents both a request and an obligation (e.g., need to perform) on the part of the creating thread. The df_SyncPointClient class is a pure virtual class that provides all the synchronization guarantees and obligations between operators. A separate derived class must be provided for every type of operator that has some dependency on shared state.

The df_SyncPointClient provides several virtual functions that the derived class can implement to perform its work, including, for example:
beforeAnyCreate
doOwnCreate
afterAllCreates
beforeAnyDestroy
doOwnDestroy
afterAllDestroys In an example embodiment the Create and Destroy operations can contain multiple phases. For example, some particular synchronization point can have doOwnCreateStage0( ), doOwnCreateStage1( ), etc; all of the threads are synchronized at the end of each of these steps.

The df_SyncPointClient itself provides all the guarantees that the synchronization will happen, that clients will be created for all active branches, and that the synchronization point will be destroyed on all active branches. It can do this dynamically.

Figure 2:
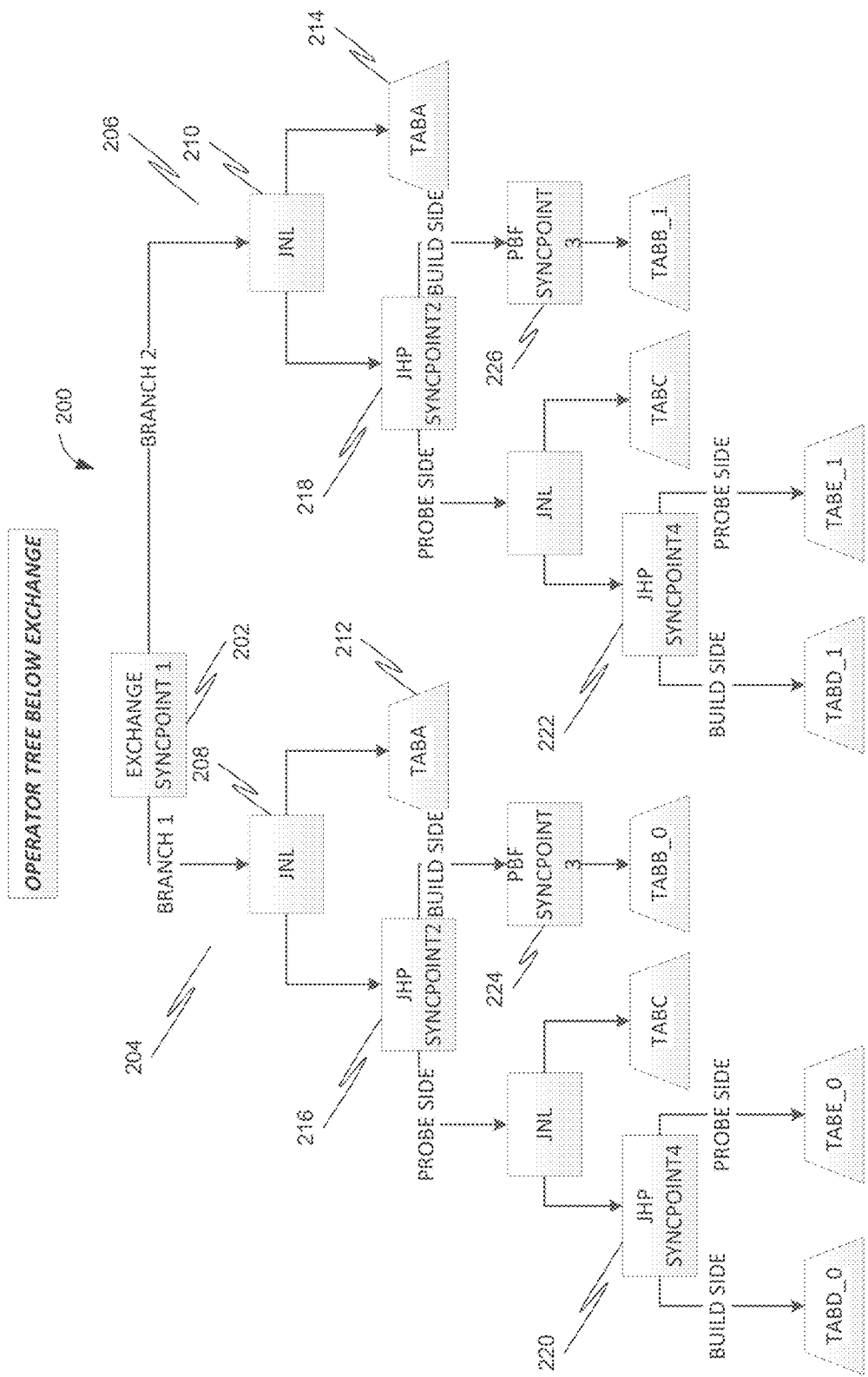
FIG. 2 is a diagram illustrating an operator tree in accordance with another example embodiment.

FIG. 2 is a diagram illustrating an operator tree 200 in accordance with another example embodiment. This operator tree 200 will be used in examples illustrated in FIGS. 3-7. The operator tree 200 can include an exchange node 202. The exchange node 202 represents the top level of this tree (or subtree). The exchange node 202 can represent an exchange operator that can exchange data across process and processor boundaries. The exchange operator can encapsulate partitioning and flow control. Underneath the exchange node 202, the tree has been duplicated into two identical or nearly identical subtrees 204, 206, also known as branches. Each subtree 204, 206 can then operate on a separate set of data, in parallel. The exchange node 202 can contain a synchronization point, here labeled synchronization point 1.

The top of each subtree 204, 206 is a join nested loop node 208, 210, which branches from the exchange node 202. Join nested loop node 208 can access table A 212, while join nested loop node 210 can also access table A 214. Table A 212 and 214 can either be a single instance of a table, or duplicate instances of the same table. Notably, each join nested loop node 208, 212 need not contain a synchronization point as there is no need to synchronize between them.

Join hash parallel nodes 216, 218 can also be present in each subtree 204, 206. Each can also contain a synchronization point, here labeled synchronization point 2, due to the need to synchronize with the other. The same can be said of join hash parallel nodes 220, 222, which also have a synchronization point, here labeled synchronization point 4.

Parallel bloom filter nodes 224, 226 are also nodes that should be synchronized with each other, and thus also can contain a synchronization point, here labeled synchronization point 3.

Figure 3:
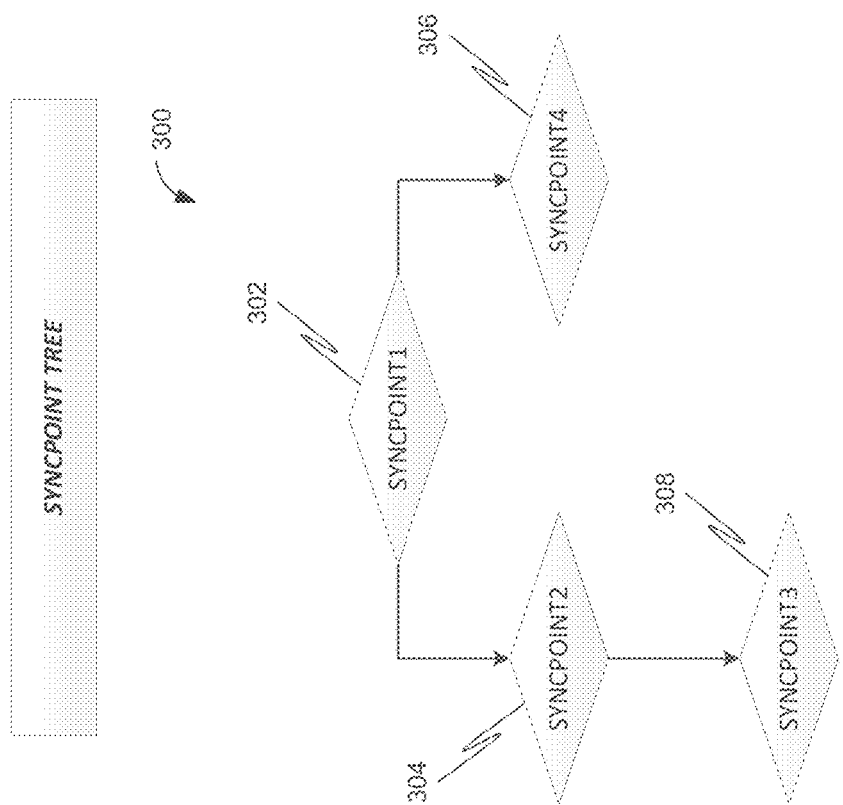
FIG. 3 is a diagram illustrating a synchronization point tree in accordance with an example embodiment.

FIG. 3 is a diagram illustrating a synchronization point tree 300 in accordance with an example embodiment. As can be seen, synchronization point 1 302 is linked to synchronization point 2 304 and synchronization point 4 306, whereas SyncPoint2 304 is linked to synchronization point 3 308.

Figure 4:
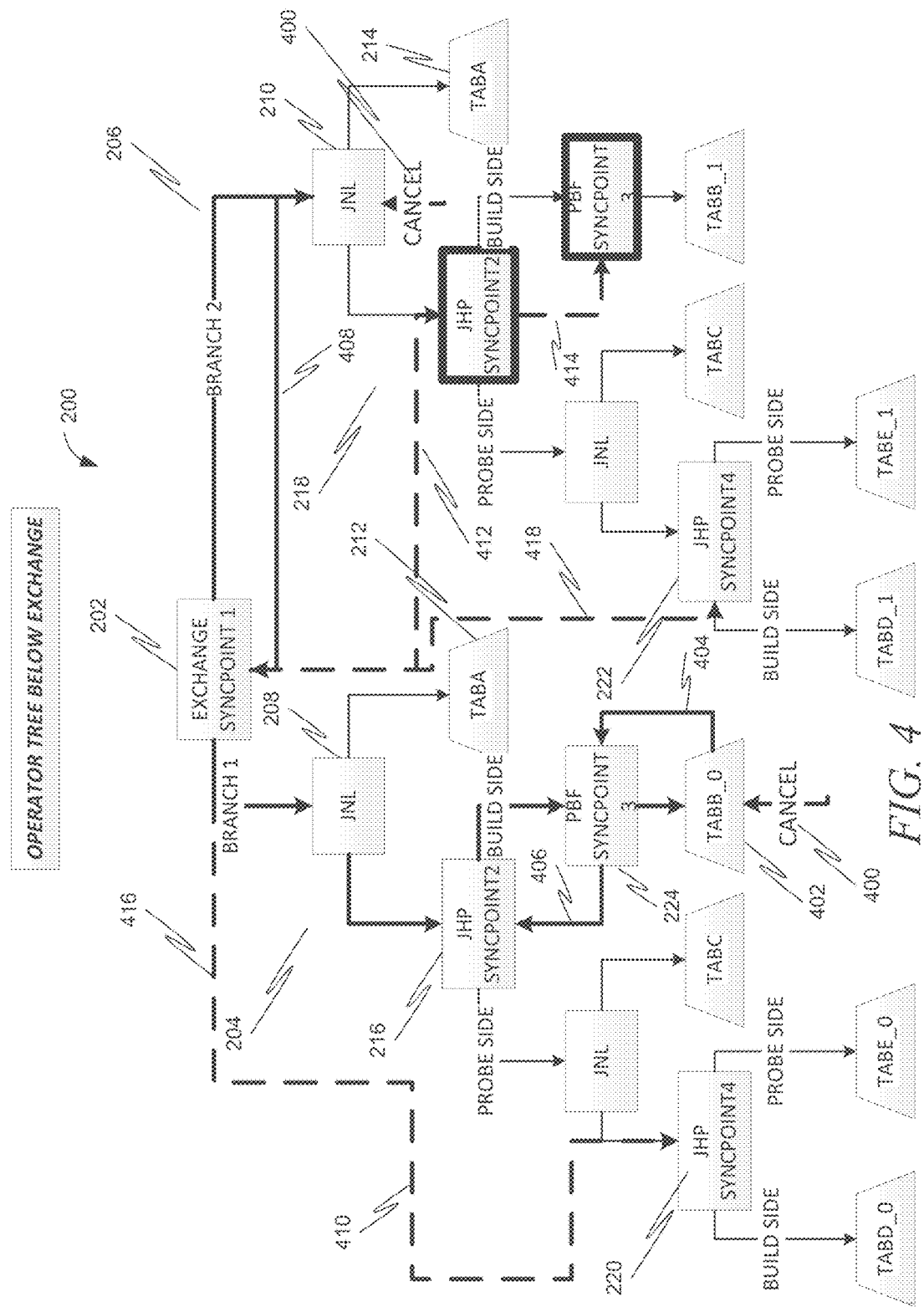
FIG. 4 is a diagram illustrating a first scenario involving the operator tree of FIG. 2, in accordance with an example embodiment.

FIG. 4 is a diagram illustrating a first scenario involving the operator tree 200 of FIG. 2, in accordance with an example embodiment.

In this scenario, the first subtree 204 receives a cancel signal after the clients for synchronization points 1, 2, and 3 are constructed (through normal execution path; operators owning the synchronization point clients for synchronization points 1, 2, and 3 invoked Create on the clients), while fetching from table TabB. At the same time, the second subtree 206 receives the cancel signal while starting execution of join nested loop node 210, after constructing the client for synchronization point 1. The cancel signal 400 is depicted as occurring both at TabB 0 402 and at join nested loop nodes 210.

Once the cancel is received, the first subtree 204 can return to for synchronization point 3, as illustrated by arrow 404, and wait there for the other branch to perform its share of work to complete units of work defined by the synchronization point, at which point it returns to synchronization point 2, as illustrated by arrow 406. The second subtree 206 returns to synchronization point 1, as illustrated by arrow 408, and as part of completing its work for a Create operation teleports to the left-most child of synchronization point 1 for which there is no client for the second subtree 206. This is depicted by arrow 412.

A client for the synchronization point 2 of the second subtree 206 is then cloned from the client for the first subtree 204, and a Create operation is performed on the newly cloned client. Once the client has performed its work locally (which will not cause creation of the client for synchronization point 3 due to the cancel), the second subtree 206 teleports to synchronization point 3, clones a new client, and performs a Create operation on the new client. This is indicated by arrow 414.

Once both branches have completed the Create operation for synchronization point 3, they return to synchronization point 2 (in subtree 204 this is through normal execution mechanisms, in subtree 206 this is through reversal of teleportation). Then a Create operation is completed at synchronization point 2, and the process returns to synchronization point 1 in the same way. To complete the creation of synchronization point 1, both subtrees 204, 206 teleport to synchronization point 4, verify there is no work to be performed, and complete the Create on synchronization point 1 clients without constructing clients for synchronization point 4. This is illustrated by arrows 410 and 418.

A Destroy operation to destroy cloned clients can be invoked by a parent synchronization point, which invokes Destroy on all child synchronization point clients unless they Destroy operations were already performed by the operator that owns the child synchronization point client through a regular execution path.

Figure 5:
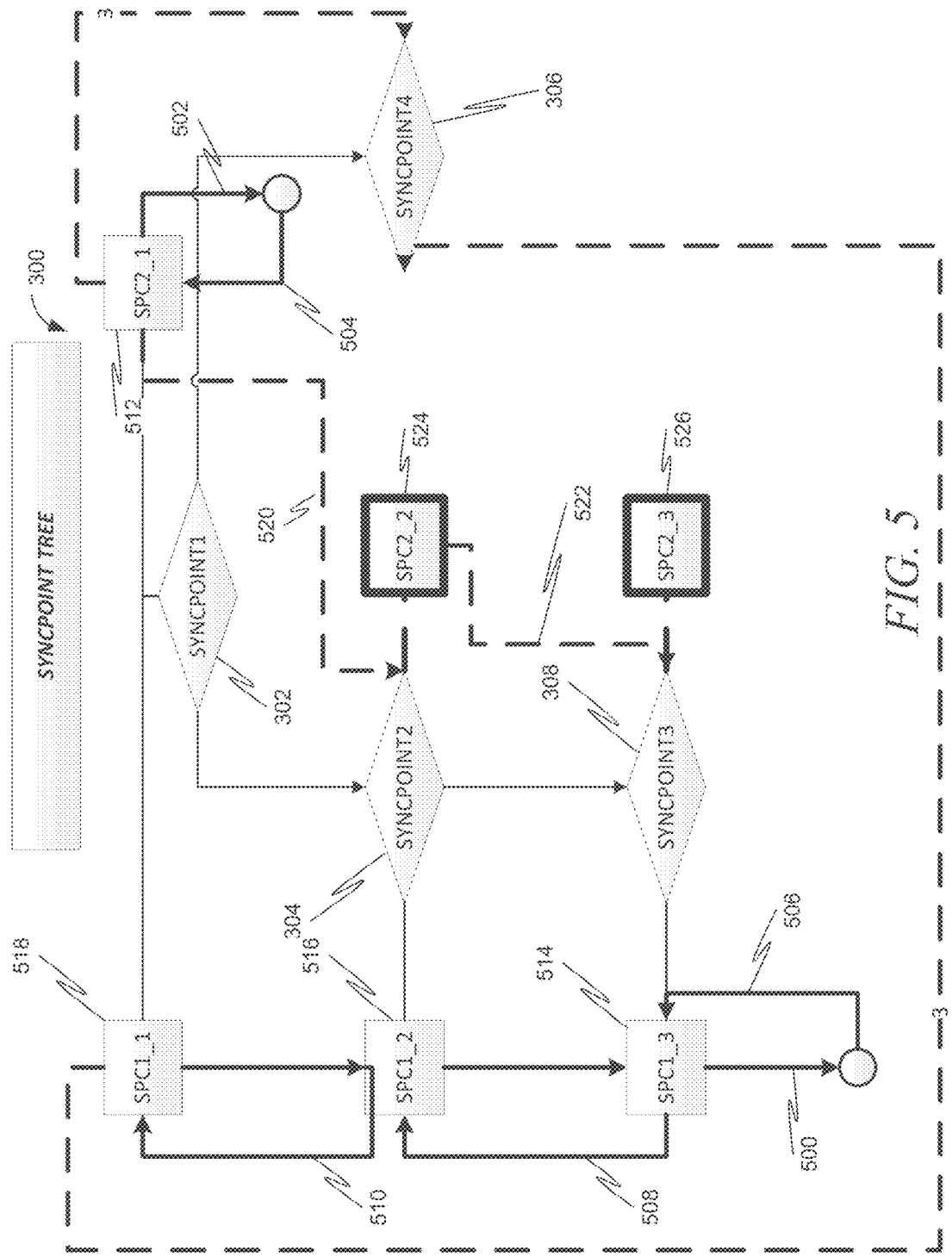
FIG. 5 is a diagram illustrating the synchronization point tree in foe first scenario in accordance with an example embodiment.

FIG. 5 is a diagram illustrating the synchronization point tree 300 in the first scenario in accordance with an example embodiment. When a cancel signal is received (depicted by arrows 500, 502), the system then returns to the parent synchronization point. Thus, arrows 504, 506, depict the system returning to parent synchronization point clients 512, 514 respectively. Then the branches fulfill the obligations to siblings. Thus arrows 520, 522 depict the branches communicating with cloned synchronization point clients 524, 526, respectively.

Following this, the system can return to parent synchronization point clients 516, 518 via arrows 508, 510.

Figure 6:
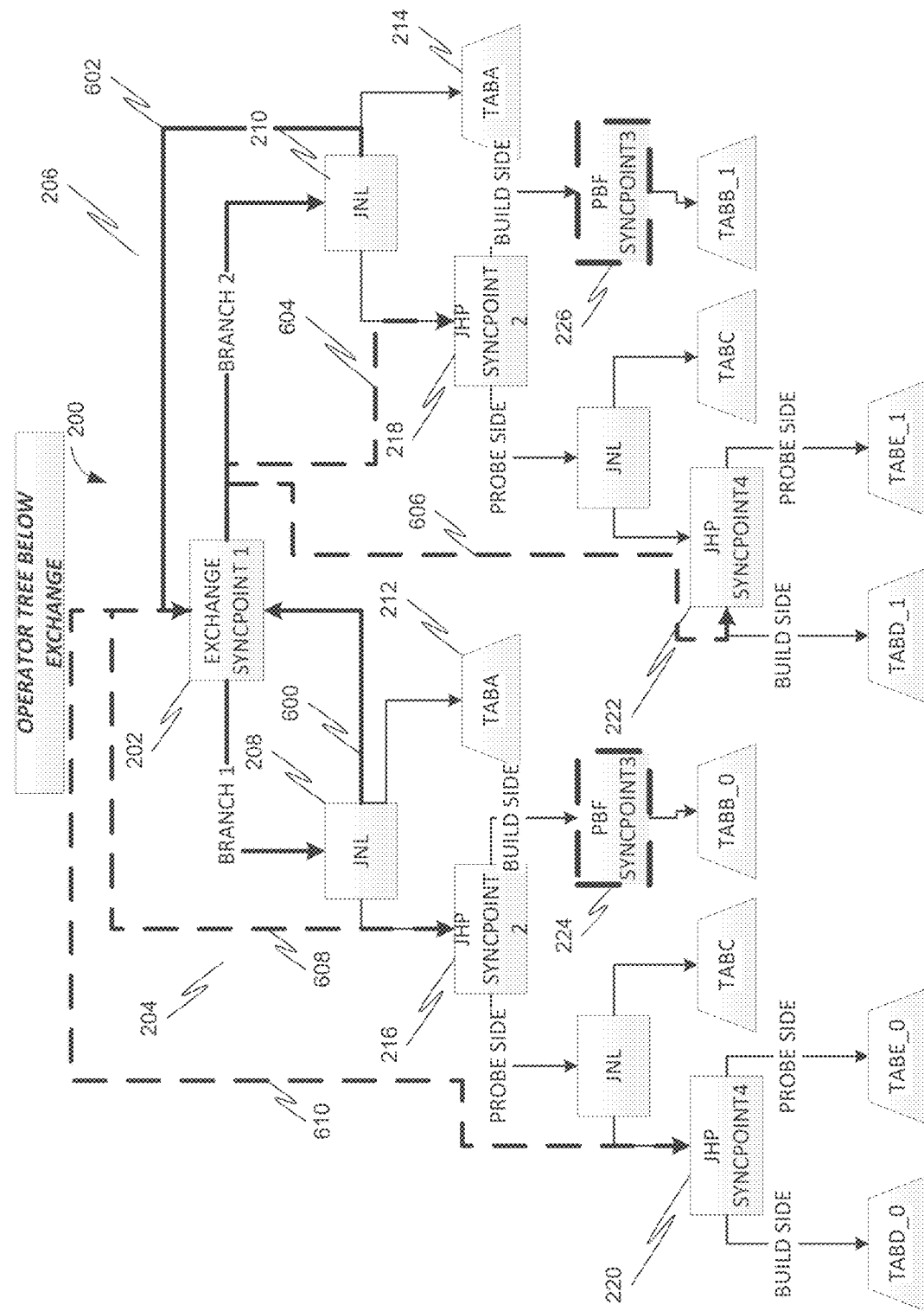
FIG. 6 is a diagram illustrating another scenario involving the operator tree of FIG. 2, in accordance with an example embodiment.

FIG. 6 is a diagram illustrating another scenario involving the operator tree 200 of FIG. 2, in accordance with an example embodiment.

In this scenario, both subtrees 204, 206 receive the cancel signal (from a user or another process) while starting execution of a first join hash parallel 216, 218, respectively, after constructing the clients for synchronization point 1. After the cancel is received, both subtrees 204, 206 return to synchronization point 1 (via arrows 600, 602), and, as part of completing their work for Create, teleport to the child synchronization points of synchronization point 1 from left to right(via arrows 604, 606, 608, 610). For subtree 204, 608 is performed and then 610. For subtree 206, 604 is performed then 606. Even though on this tree tins appears to be right-to-left traversal, it is left-to-right when applied to the synchronization point relationship tree (FIG. 7), which guides the traversal here. The subtrees then do not do any work there as no client was constructed for the synchronization points 2 and 4 during normal execution. Since synchronization point 2 has no work to perform, synchronization point 3 is not visited. Once checking is complete, and the common artifact "constructed" (no work is redly done as an error was received), both subtrees 204, 206 complete a Create operation and return to the invoker. A Destroy operation is invoked for the synchronization point Clients through normal execution mechanisms.

Figure 7:
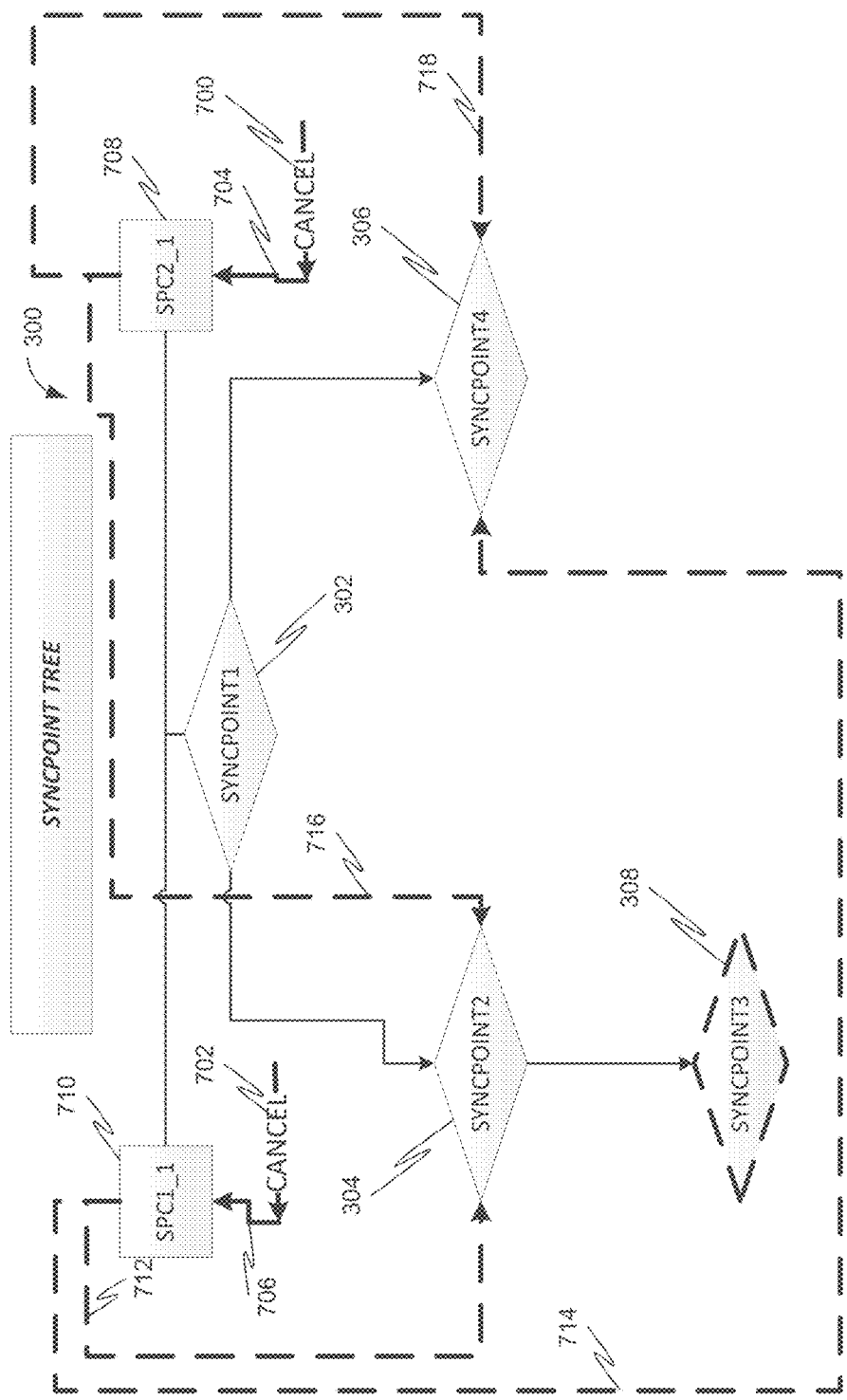
FIG. 7 is a diagram illustrating the synchronization point tree in the other scenario in accordance with an example embodiment.

FIG. 7 is a diagram illustrating the synchronization point tree 400 in the scenario shown in FIG. 6 in accordance with an example embodiment. When a cancel signal is received (depicted by arrows 700, 702), the system then returns to the current synchronization point client. Thus, arrows 704, 706 depict the system returning to current synchronization point clients 708, 710. Then the branches fulfill the obligations to siblings. Thus arrows 712, 714, 716, 718 depict the branches communicating with synchronization points 304 and 306. Notably, synchronization point 308 is not reached.

Figure 8:
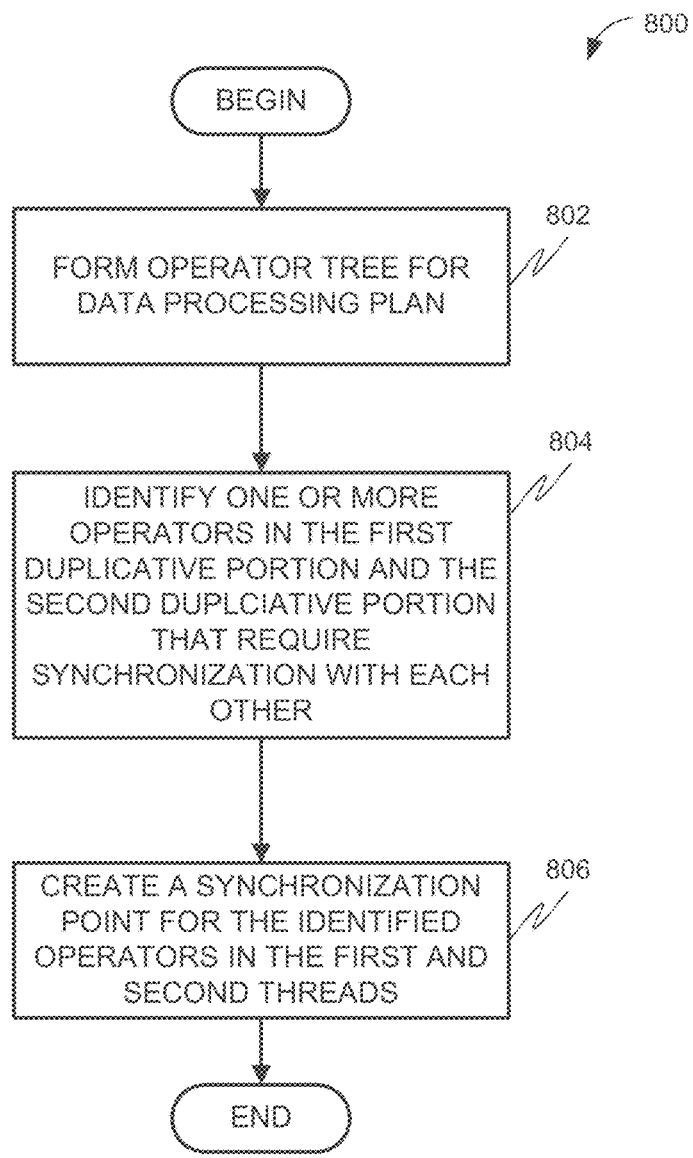
FIG. 8 is a flow diagram illustrating a method, in accordance with an example embodiment for performing data processing operations in parallel.

FIG. 8 is a flow diagram illustrating a method 800, in accordance with an example embodiment, for performing data processing operations in parallel. Method 800 can be performed by processing logic that can comprise hardware (e.g. circuitry, dedicated logic, programmable logic, microcode, etc.), software (e.g., instructions run on a processing device), or a combination thereof. In one example embodiment, the method 800 is performed by a data access module 116 of FIG. 1, as described above. At operation 802, an operator tree is formed for a data processing plan. The operator tree can contain multiple interconnected nodes, and specifically can include a grouping of two or more duplicative portions, each of the two or more duplicative portions having identical nodes and structure such that when the operator tree is executed, operators executed in a first duplicative portion using a first thread perform the same functions as operators executed in a second duplicative portion using a second thread but on different data. The operator tree can be formed in a number of different ways. In one example embodiment, an operator tree is first formed for a data processing plan and then one or more portions of the operator tree that can be run in parallel are identified. These portions can then be duplicated at that stage, resulting in the two or more duplicative portions described above. In another example embodiment, the duplicative portions are generated in parallel as the operator tree is first formed. In another example embodiment, run-time structures are created for the same static structure during execution. It should also be noted that the term "different data" shall be interpreted to cover data that has at least one portion that is different than the comparison data set. Thus, for example, one set of data that includes items A, B, and C is considered different than a set of data including items A, B, and D, despite the presence of A and B in both sets. In another example, one set of data that includes items A, B, and C is considered different than a set of data including items A and B, despite she presence of A and B in both sets.

At operation 804, one or more operators are identified in the first duplicative portion and one or more operators are identified in the second duplicative portion foal are to be synchronized with each other. At operation 806, a synchronization points are created for the identified operators in the first thread and second threads, the synchronization points can receive information from each of the identified operators and build artifacts to deliver to one or more operators that depend on the artifacts.

It should be noted that while the above examples describe and depict embodiments having pairs of duplicative portions (e.g., a first duplicative portion and a second duplicative portion), in an example embodiment more than two duplicative portions can be used (e.g., a third duplicative portion can exist as well and be integrated into the synchronization point organization).

Example Mobile Device

Figure 9:
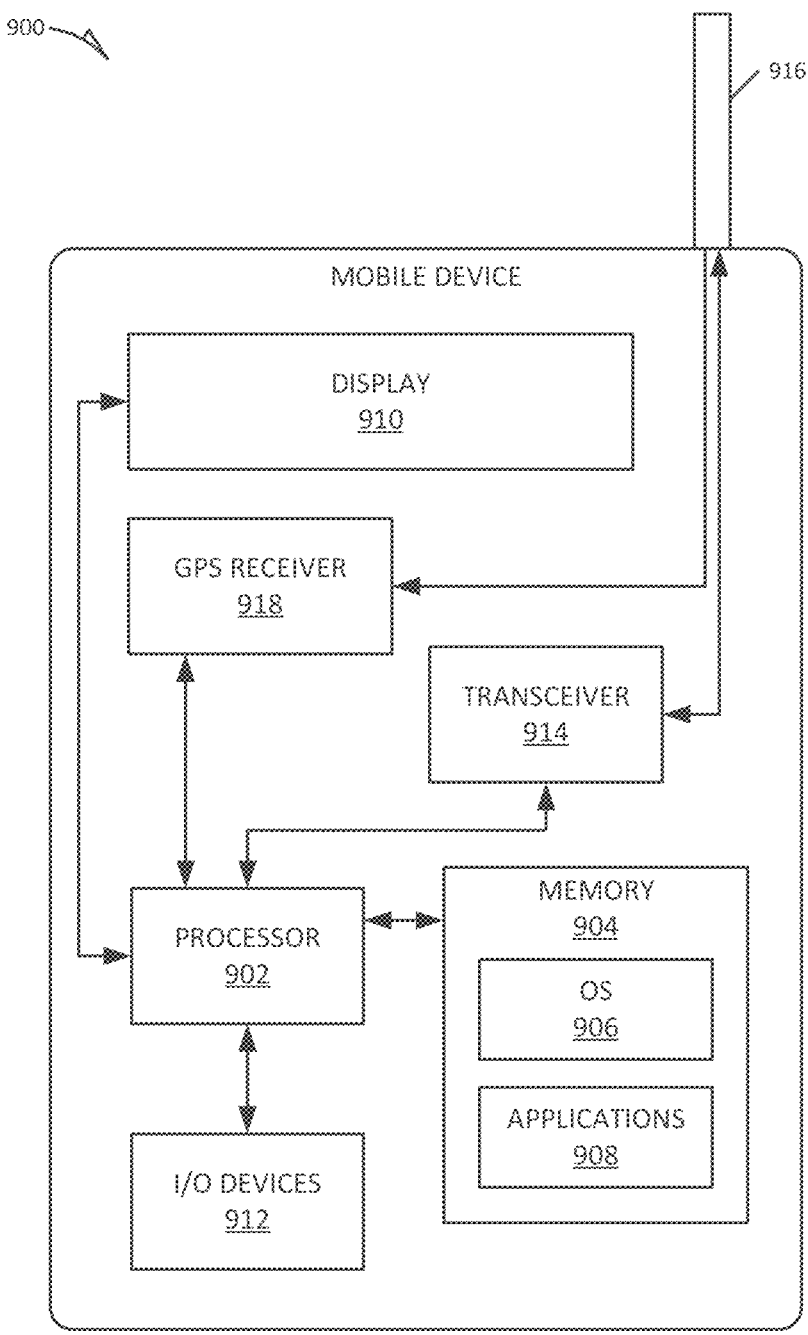
FIG. 9 is a block diagram illustrating a mobile device, in accordance with an example embodiment.

FIG. 9 is a block diagram illustrating a mobile device 900, according to an example embodiment. The mobile device 900 can include a processor 902. The processor 902 can be any of a variety of different types of commercially available processors suitable for mobile devices (for example, an XScale architecture microprocessor, a Microprocessor without Interlocked Pipeline Stages (MIPS) architecture processor, or another type of processor). A memory 904, such as a Random Access Memory (RAM), a Flash memory, or other type of memory, is typically accessible to the processor. The memory 904 can be adapted to store an operating system (OS) 906, as well as application programs 908, such as a mobile location enabled application that can provide LBSs to a user. The processor 902 can be coupled, either directly or via appropriate intermediary hardware, to a display 910 and to one or more input/output (I/O) devices 912, such as a keypad, a touch panel sensor, a microphone, and the like. Similarly, in some embodiments, the processor 902 can be coupled to a transceiver 914 that interfaces with an antenna 916. The transceiver 914 can be configured to both transmit and receive cellular network signals, wireless data signals, or other types of signals via the antenna 916, depending on the nature of the mobile device 900. Further, in some configurations, a GPS receiver 918 can also make use of the antenna 916 to receive GPS signals.

Modules, Components and Logic

Certain embodiments are described herein as including logic or a number of components, modules, or mechanisms. Modules can constitute either software modules (e.g., code embodied (1) on a non-transitory machine-readable medium or (2) in a transmission signal) or hard ware-implemented modules. A hardware-implemented module is tangible unit capable of performing certain operations and can be configured or arranged in a certain manner. In example embodiments, one or more computer systems (e.g., a standalone, client or server computer system) or one or more processors can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor can be configured as respective different hardware-implemented modules at different times. Software can accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple such hardware-implemented modules exist contemporaneously, communications can be achieved through signal transmission (e.g., over appropriate circuits and buses) that connect the hardware-implemented modules. In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can in some example embodiments, comprise processor-implemented modules.

Similarly, the methods described herein can be at least partially processor-implemented. For example, at least some of the operations of a method can be performed by one of processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or as a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the Internet) and via one or more appropriate interlaces (e.g., Application Program Interfaces (APIs).)

Electronic Apparatus and System

Example embodiments can be implemented in digital electronic circuitry, or in computer hardware, firmware, software, or in combinations of them. Example embodiments can be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry, e.g., a FPGA or an ASIC The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), m temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Example Machine Architecture and Machine-Readable Medium

Figure 10:
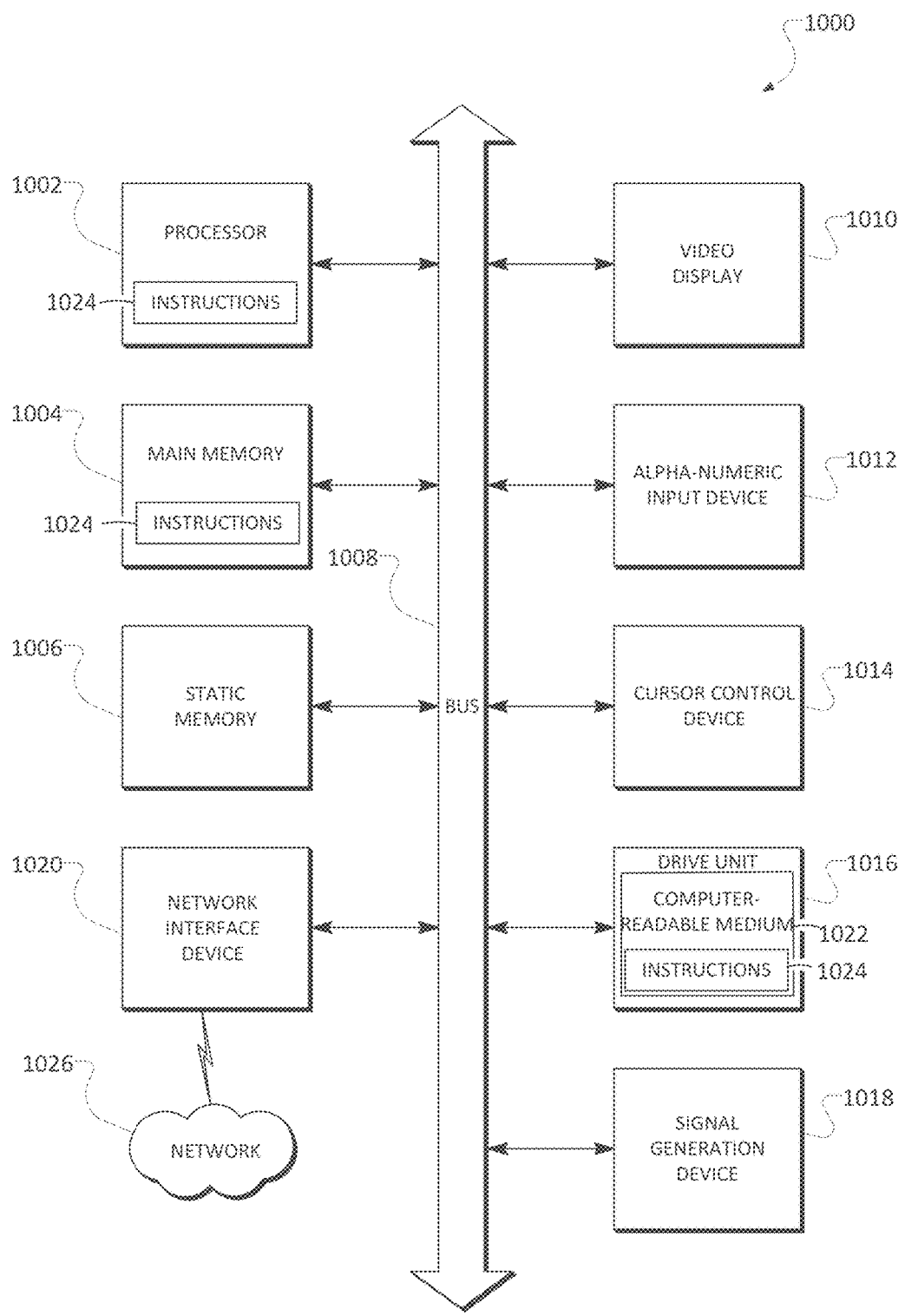
FIG. 10 is a block diagram of machine in the example form of a computer system within which instructions, for causing the machine to perform any one or more of the methodologies discussed herein, can be executed.

FIG. 10 is a block diagram of machine in the example form of a computer system 1000 within which instructions, for causing the machine to perform any one or more of the methodologies discussed herein, can be executed. In alternative embodiments, the machine operates as a standalone device or can be connected (e.g., networked) to other machines. In a networked deployment, the machine can operate m the capacity of a server or a client machine in server-client network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a Single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both, a main memory 1004 and a static memory 1006, which communicate with each other via a bus 1008. The computer system 1000 can further include a video display unit 1010 (e.g., a liquid crystal display (LCD) or a cathode ray tube (CRT)). The computer system 1000 also includes an alpha-numeric input device 1012 (e.g., a keyboard or a touch-sensitive display screen), a user interface (UI) navigation device 1014 (e.g., a mouse), a disk drive unit 1016, a signal generation device 1018 (e.g., a speaker), and a network interface device 1020.

Machine-Readable Medium

The disk drive unit 1016 includes a machine-readable medium 1022 on which is stored one or more sets of instructions and data structures (e.g., software) 1024 embodying or utilized by any one or more of the methodologies or functions described herein. The instructions 1024 can also reside, completely or at least partially, within the main memory 1004 and/or within lire processor 1002 during execution thereof by the computer system 1000, with foe main memory 1004 and the processor 1002 also constituting machine-readable media.

While the machine-readable medium 1022 is shown in an example embodiment to be a single medium, the term "machine-readable medium" can include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices: magnetic disks such as internal hard disks and removable disks; magneto-optical disks; and CD-ROM and DVD-ROM disks.

Transmission Medium

The instructions 1024 can further be transmitted or received over a communications network 1026 using a transmission medium. The instructions 1024 can be transmitted using the network interface device 1020 and any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for performing data processing operations in parallel, the method comprising:
    forming, using one or more hardware processors, an operator tree for a data processing plan, the operator tree containing a plurality of interconnected nodes, the operator tree including a first grouping of two or more parallel portions;
    identifying a first set of one or more operators represented by a first parallel portion of the two or more parallel portions of the operator tree, the first set of one or more operators to be executed by a first thread, and a second set of one or more operators represented by a second parallel portion of the two or more parallel portions of the operator tree, the second first set of one or more operators to be executed by a second thread, the first set of one or more operators and the second set of one or more operators to use a shared unit of work;
    creating a synchronization point for a first synchronized thread operator of the first set of one or more operators and a second synchronized thread operator of the second set of one or more operators, the first synchronized thread operator being executed prior to a last operation of the first thread and the second synchronized thread operator being executed prior to a last operation of the second thread;
    receiving, by the synchronization point, first information from the first synchronized thread operator and second information from the second synchronized thread operator;
    building, by the synchronization point, an artifact, the artifact being built prior to a create process completion on the first parallel portion or on the second parallel portion, the artifact being accessed by at least one of the first set of one or more operators executed by the first thread and accessed by at least one of the second set of one or more operators executed by the second thread, wherein the artifact comprises the shared unit of work; and
    maintaining the artifact until the first synchronized thread operator and the second synchronized thread operator no longer need access to the artifact.

2. The method of claim 1, wherein the forming includes:
    constructing the data processing plan in the form of the operator tree;
    identifying the first parallel portion of the operator tree; and
    duplicating the first parallel portion of the operator tree to form the second parallel portion of the operator tree.

3. The method of claim 1, wherein the operator tree further includes a third parallel portion such that when the operator tree is executed, operators corresponding to the third parallel portion using the first thread perform same functions as operators corresponding to the third parallel portion using a third thread, wherein the operators corresponding to the third parallel portion use different data than operators corresponding to the first parallel portion, the identifying further includes identifying one or more operators corresponding to the third parallel portion to be synchronized with the identified operators corresponding to the first parallel portion and the operators in the second parallel portion, and the creating including creating a synchronization point for the identified operators corresponding to the first, second, and third threads.

4. The method of claim 2, further comprising constructing the data processing plan from a database query.

5. The method of claim 4, wherein the constructing the data processing plan from the database query includes parsing a data processing request into data processing operators.

6. The method of claim 1, further comprising creating a synchronization point client for each of the synchronized thread operators, the synchronization point client, when called by a corresponding thread, interacts with the synchronization point to deliver the information.

7. The method of claim 6, an end of each branch of execution is defined by a merging of parallel branches of execution.

8. The method of claim 1, wherein the synchronization point is further based on a dependency between a lower layer of the first parallel portion and at least another branch of the two or more parallel portions.

9. The method of claim 1, further comprising:
    determining if an operator at a lower level than one of the synchronized thread operators has completed operation; and
    in response to a determination that the operator at the lower level has not completed operation, teleporting to the operator at the lower level prior to completing building the artifact at the synchronization point.

10. A system comprising:
    one or more hardware processors;
    memory to store instructions that, when executed by the one or more hardware processors perform operations comprising:
    forming an operator tree for a data processing plan, the operator tree containing a plurality of interconnected nodes, the operator tree including a grouping of two or more parallel portions;
    identifying a first set of one or more operators represented by a first parallel portion of the two or more parallel portions of the operator tree, the first set of one or more operators to be executed by a first thread, and second set of one or more operators represented by a second parallel portion of the two or more parallel portions of the operator tree, the second set of one or more operators to be executed by a second thread, the first set of one or more operators and the second set of one or more operators to use a shared unit of work; and creating a synchronization point for a first synchronized thread operator of the first set of one or more operators and a second synchronized thread operator of the second set of one or more operators, the first synchronized thread operator being executed prior to a last operation of the first thread and the second synchronized thread operator being executed prior to a last operation of the second thread;

receiving, by the synchronization point, first information from the first synchronized thread operator and second information from the second synchronized thread operator;

building, by the synchronization point, an artifact, the artifact being built prior to a create process completion on the first parallel portion or on the second parallel portion, the artifact being accessed by at least one of first set of one or more operators executed by the first thread and accessed by at least one of the second set of one or more operators executed by the second thread, wherein the artifact comprises the shared unit of work; and maintaining the artifact until the first synchronized thread operator and the second synchronized thread operator no longer need access to the artifact.

11. The system of claim 10, wherein the forming includes:
constructing the data processing plan in the form of the operator tree;
identifying the first parallel portion of the operator tree; and
duplicating the first parallel portion of the operator tree to form the second parallel portion of the operator tree.

12. The system of claim 10, wherein the operator tree further includes a third parallel portion such that when the operator tree is executed, operators corresponding to the third parallel portion using the first thread perform same functions as operators corresponding to the third parallel portion using a third thread, wherein the operators corresponding to the third parallel portion use different data than operators corresponding to the first parallel portion, the identifying further includes identifying one or more operators corresponding to the third parallel portion to be synchronized with the identified operators corresponding to the first parallel portion and the operators in the second parallel portion, and the creating including creating a synchronization point for the identified operators corresponding to the first, second, and third threads.

13. The system of claim 11, the operations further comprising constructing the data processing plan from a database query.

14. The system of claim 13, wherein the constructing the data processing plan from the database query includes parsing a data processing request into data processing operators.

15. The system of claim 10, the operations further comprising creating a synchronization point client for each of the synchronized thread operators, the synchronization point client, when called by a corresponding thread, interacts with the synchronization point to deliver the information.

16. The system of claim 15, an end of each branch of execution is defined by a merging of parallel branches of execution.

17. The system of claim 10, wherein the synchronization point is further based on a dependency between a lower layer of the first parallel portion and at least another branch of the two or more parallel portions.

18. The system of claim 10, the operations further comprising:
determining if an operator at a lower level than one of the synchronized thread operators has completed operation; and
in response to a determination that the operator at the lower level has not completed operation, teleporting to the operator at the lower level prior to completing building the artifact at the synchronization point.

19. A non-transitory machine-readable storage medium comprising instructions, which when implemented by one or more machines, cause the one or more machines to perform operations comprising:
forming an operator tree for a data processing plan, the operator tree containing a plurality of interconnected nodes, the operator tree including a grouping of two or more parallel portions;
identifying a first set of one or more operators represented by a first parallel portion of the two or more parallel portions of the operator tree, the first set of one or more operators to be executed by a first thread, and a second set of one or more operators represented by a second parallel portion of the two or more parallel portions of the operator tree, the second set of one or more operators to be executed by a second thread, the first set of one or more operators and the second set of one or more operators to use a shared unit of work;
creating a synchronization point for a first synchronized thread operator of the first set of one or more operators and a second synchronized thread operator of the second set of one or more operators, the first synchronized thread operator being executed prior to a last operation of the first thread and the second synchronized thread operator being executed prior to a last operation of the second thread;
receiving, by the synchronization point, first information from the first synchronized thread operator and second information from the second synchronized thread operator;
building, by the synchronization point, an artifact, the artifact being built prior to a create process completion on the first parallel portion or on the second parallel portion, the artifact being accessed by at least one of first set of one or more operators executed by the first thread and accessed by at least one of the second set of one or more operators executed by the second thread; and
maintaining the artifact until the first synchronized thread operator and the second synchronized thread operator no longer need access to the artifact.

20. The non-transitory machine-readable storage medium of claim 19, wherein the forming includes:
constructing the data processing plan in the form of the operator tree;
identifying the first parallel portion of the operator tree that can be run in parallel; and
duplicating the first parallel portion of the operator tree to form the second parallel portion in the operator tree.

* * * * *